United States Patent [19]

Föller

[11] 4,248,376
[45] Feb. 3, 1981

[54] THERMALLY-CONTROLLED VALVE

[75] Inventor: Werner Föller, Stuhr, Fed. Rep. of Germany

[73] Assignee: Gestra-Ksb Vertriebsgesellschaft mbH & Co. KG, Bremen, Fed. Rep. of Germany

[21] Appl. No.: 69,666

[22] Filed: Aug. 24, 1979

[30] Foreign Application Priority Data

Aug. 28, 1978 [DE] Fed. Rep. of Germany ....... 2837537

[51] Int. Cl.³ ............................................ G05D 23/12
[52] U.S. Cl. ..................................... 236/58; 236/93 A
[58] Field of Search ................ 236/56, 58, 93 A, 99 J; 165/40; 73/368.3

[56] References Cited

U.S. PATENT DOCUMENTS

| 598,824 | 2/1898 | Stucki | 236/58 |
| 748,888 | 1/1904 | Still | 236/58 |
| 1,132,184 | 3/1915 | Howard | 236/58 |
| 1,572,970 | 2/1926 | Stalker | 236/58 X |
| 2,289,020 | 7/1942 | Jones | 236/58 |
| 4,161,278 | 7/1979 | Klann et al. | 236/56 |

Primary Examiner—William E. Tapolcai, Jr.
Attorney, Agent, or Firm—Allison C. Collard; Thomas M. Galgano

[57] ABSTRACT

A valve is provided of the type which includes a valve housing having a valve seat, a thermal control element mounted in the valve housing having a thin, rigid wall portion and a membrane member coupled peripherally with the wall portion, so as to define an expansion chamber therebetween in which an expansion medium is disposed and a locking member which is activated by the membrane for cooperative coaction with the valve seat. The valve is characterized by the provision of a valve housing having an inner chamber which substantially corresponds in size and shape to the outer configuration of the thermal control element. The inner chamber is provided with flow conduits disposed along the surface of the control element. The flow conduits are coupled to an inlet opening of the valve housing and an outlet opening defined by the opening of the locking member relative to the valve seat. The valve is especially intended for steam traps.

5 Claims, 3 Drawing Figures

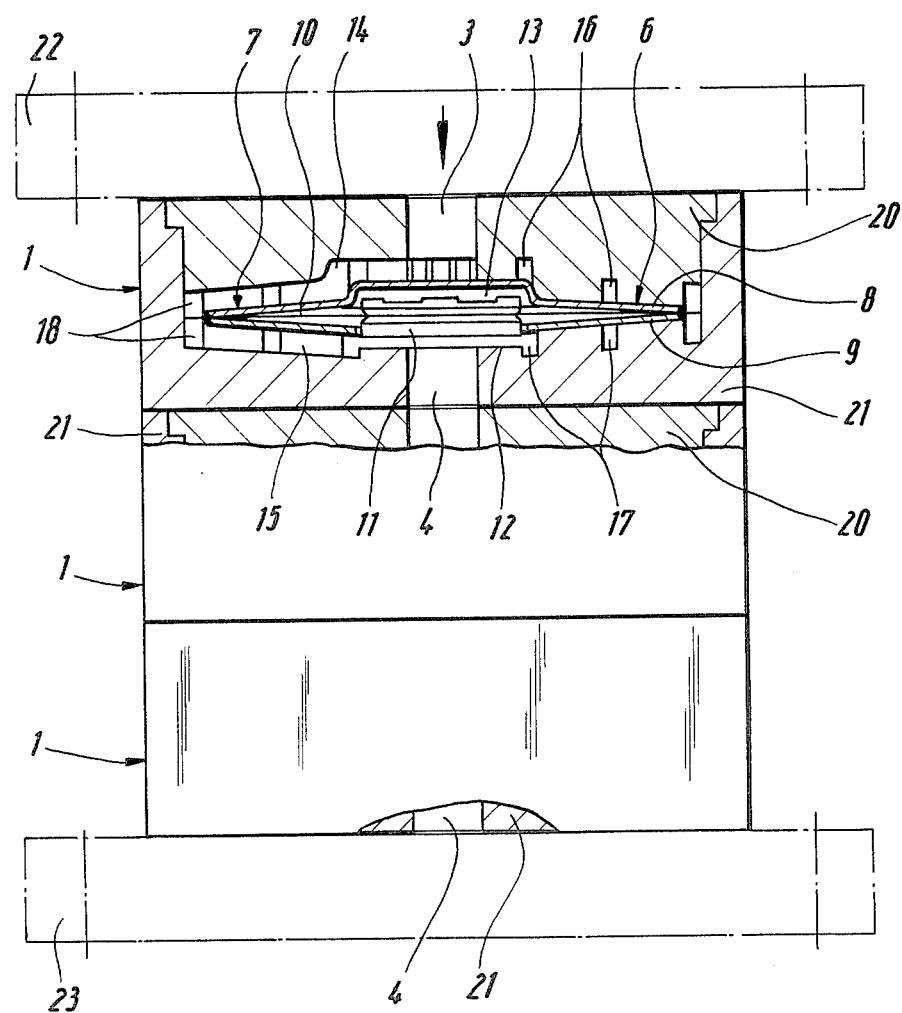

THERMALLY-CONTROLLED VALVE

The invention relates to a valve. More particularly, it concerns a valve for a steam trap of the type which includes a valve housing, a thermal control element mounted in the valve housing, having at least one relatively thin rigid wall portion, a flexible membrane coupled to the periphery of the wall portion so as to define therebetween an expansion chamber in which an expansion medium is disposed, and a locking member which is actuated by the membrane for cooperative coaction with a valve seat of the valve housing.

In cup-shaped thermal control elements (for example, bellows and siphon diaphragms), not only the elastic but also the rigid wall parts are made of relatively thin walls, so as to provide a sufficiently large moveability of the elastic part, a good heat transfer characteristic and a good weldability between the rigid and the elastic parts. On account of the thin walls, the load capacity of such control elements with high differential pressures, is rather limited.

For example, if such a thermal control element is used in a steam trap having high operating pressures (for example, 40 PN and higher) and where it would be exposed to superheated steam, which is quite possible, a very high inner excess pressure of the expansion medium is generated in the control element. The result is a deformation and breaking up or rupture of the control element.

It is therefore an object of the invention to provide a valve of the aforementioned type, having a thin wall which is not subject to dangerous rupture due to high inner pressures.

This is achieved in accordance with the present invention by the provision of a valve of the aforementioned type, which includes a valve housing having an inner chamber which substantially corresponds in size and shape to the outer configuration of the thermal control element. These flow conduits are coupled to an inlet opening of the valve housing and an outlet opening defined by the opening of the locking member relative to the valve seat.

As a result thereof, the valve housing immediately encompasses the thermal control element and thereby supports the control element against excessively high inner superpressures, thus preventing a deformation of the wall portions. At the same time, the membrane member receives the required support by the valve housing. This occurs because the membrane member engages directly against the valve housing or is supported by a thin support wall of the control element against the valve housing. The control element is immediately exposed to the medium to be discharged due to the specific flow conduits provided in the valve housing, so that a good and rapidly-reacting heat transfer is assured between the medium discharged outside of the control element and the expansion medium within the control element.

In a preferred embodiment of the invention, the valve housing has interior wall faces, which define the inner chamber, and the flow conduits are disposed in these wall faces such that they open in a direction towards the surface of the control element.

Most advantageously, the valve housing is composed of two housing portions, each having the flow conduits formed therein and joined together along a separating joint. An annular groove is provided in the inner chamber of the valve housing in the area of the separating joint, and the flow conduits of both of the housing portions are coupled to the annular groove. This provides a specifically simple structural solution for the connection between the flow conduits in both parts of a two-compartment valve housing. In each given relative circumferential position of the two housing parts, it is assured that the discharging medium flows from the flow conduits at the distal side of the valve seat of the control element to the proximal side of the valve seat of the control element.

For a particularly simple and compact embodiment of the valve housing structure, the valve housing is composed of two generally disc-shaped elements which are coupled with each other at their edges and which provide, aligned in the axial direction of the disc-shaped elements, the inlet and outlet openings of the valve housing. This solution is predestined, in particular, for installation as a clamping armature between two pipe flanges. At the same time and in conjunction with the provision of a plurality of superimposed valves, a multi-stage valve arrangement can be realized in a very simple manner, which is of great advantage at high pre-pressure.

Other objects and features of the present invention will become apparent from the following detailed description considered in connection with the accompanying drawings which disclose several embodiments of the invention. It is to be understood, however, that the drawings are designed for the purpose of illustration only and not as a definition of the limits of the invention.

In the drawings, wherein similar reference characters denote similar elements through the several views:

FIG. 3 is a sectional view, in part elevation, of an assembly of three successively-disposed steam traps, taken along line 1—1 of FIG. 2.

Figure 1:
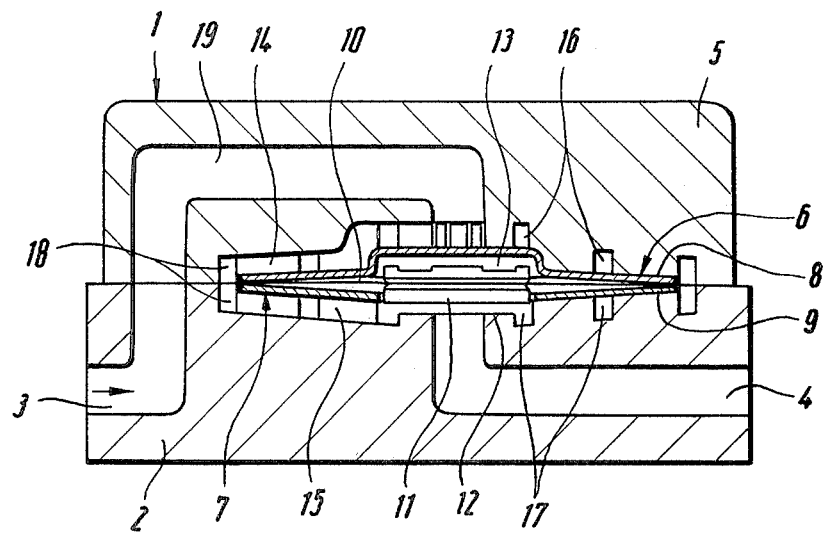
FIG. 1 is a sectional view of a thermally-controlled steam trap taking along line I—I of FIG. 2.
Figure 2:
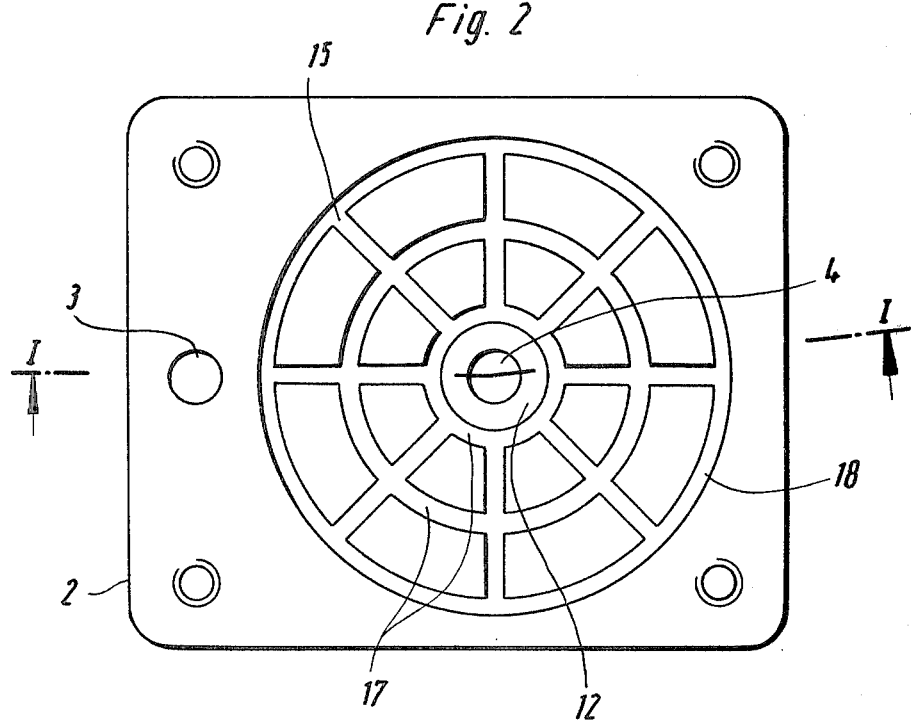
FIG. 2 is a plan view of the lower housing portion of the steam trap shown in FIG. 1.

Referring now in detail to the drawings, in the embodiment shown in accordance with FIGS. 1 and 2, a valve housing I is composed of a lower portion 2 with inlet and outlet openings 3 and 4, respectively, and an upper portion 5. A thermal control element 7 is provided in an inner chamber 6 of valve housing 1. Thermal control elements 7 is composed of two, thin-walled portions 8,9, as well as an intermediate membrane member 10, which is peripherally welded to wall parts 8,9. Membrane member 10 centrally supports a locking member 11, which cooperates with a valve seat 12. An expansion chamber 13 of control element 7, which is defined between the rigid wall portion 8 and membrane member 10, contains an expansion liquid which is preferably an evaporation liquid.

The inner chamber 6 of valve housing 1 is so shaped that it corresponds in shape and size substantially to the outer shape or contour of control element 7. Consequently, valve housing 1 encompasses wall portions 8,9 of control element 7 from the outside, immediately and solidly. The wall faces of inner chamber 6 have star-like or radially-running grooves 14,15 and concentric lateral grooves 16,17. Furthermore, an annular groove 18 is provided in the area of the separating joint of the two housing portions 2,5 encompassing control element 7, connecting grooves 14,15 with each other. A connecting bore 19 extends between inlet opening 3 and grooves 14.

During discharge, the condensate flows through inlet opening 3 and the connecting bore 19 into grooves 14 and the lateral grooves 16 of upper portion 5 of valve housing 1. The condensate then flows through annular groove 18 and into grooves 15 and lateral grooves 17, and finally to valve seat 12 and outlet opening 4. In this path of the condensate flow, control element 7 is immediately exposed on all sides by the discharging condensate, so that the temperature in expansion chamber 13 reacts quickly and adjusts to the given temperature of the flowing condensate, thus assuring a hesitant-free operation of control element 7. Thin-walled wall portions 8,9 of control element 7, by themselves, are not adequately resistant against the high expansion pressures in expansion chamber 13.

During an unavoidable exposure of control element 7 to superheated steam having a high pressure, very high inner pressures are created in control element 7. However, since valve housing 1 is rigidly mounted on the two wall portions 8,9 of control element 7, the latter is sufficiently protected against deformation or rupture due to excess inner pressure.

The width of grooves 14,15 and lateral grooves 16,17, which interrupt the support faces of inner chamber of the valve housing, are so dimensioned that no overloading occurs in these areas of control element 7.

In FIG. 3, valve housing 1 is composed of two complementary, disc-shaped elements 20,21, which are fitted into each other and which at their center and along the longitudinal direction thereof, provide the inlet and outlet openings 3,4. This housing embodiment also solidly encompasses control element 7 and also provides radial grooves 14,15, lateral grooves 16,17 and annular groove 18.

This extremely small and easily constructed housing structure variation is especially suited as a clamping armature or mounting between flanges 22,23. As is also obvious from FIG. 3, a plurality of steam traps may be easily superimposed, in order to form a very compact steam trap group for a multi-stage release of condensate which has high pressure.

While only several embodiments of the present invention have been shown and described, it will be obvious to those persons of ordinary skill in the art, that many changes and modifications may be made thereunto, without departing from the spirit and scope of the invention.

What is claimed is:

1. In a valve of the type which includes a valve housing having a valve seat, a thermal control element mounted in the valve housing having a thin, rigid wall portion and a membrane member coupled peripherally with the wall portion so as to define an expansion chamber therebetween, in which an expansion medium is disposed and a locking member which is activated by the membrane for cooperative coaction with the valve seat, the improvement comprising: said valve housing having interior wall faces which define an inner chamber which substantially corresponds in size and shape to the outer configuration of said thermal control element, said wall faces being provided with flow conduits disposed along the surface of said control element, said flow conduits being coupled to an inlet opening of said valve housing and an outlet opening defined by the opening of said locking member relative to said valve seat.

2. The valve according to claim 1, wherein said flow conduits are open in a direction towards the surface of said control element.

3. The valve according to claim 1 or 2, wherein said valve housing is composed of two housing portions, each having said flow conduits formed therein, joined together along a separating joint, wherein an annular groove is provided in said inner chamber of said valve housing in the area of said separating joint and wherein the flow conduits of both of said housing portions are coupled to said annular groove.

4. The valve according to claim 1, wherein said valve housing is composed of two generally disc-shaped elements which are coupled with each other at their edges and which provide, aligned in the axial direction of said disc-shaped element, said inlet and outlet openings.

5. The valve according to claim 4, wherein a plurality of said valves are superimposed for a multi-stage valve arrangement.

* * * * *